US007658987B2

(12) United States Patent
Warburton

(10) Patent No.: US 7,658,987 B2
(45) Date of Patent: Feb. 9, 2010

(54) X-RAY DEVICE COMPONENT WITH EMISSIVE INORGANIC COATING

(75) Inventor: Don Warburton, West Jordan, UT (US)

(73) Assignee: Varian Medical Systems, Inc., Palo Alto, CA (US)

( * ) Notice: Subject to any disclaimer, the term of this patent is extended or adjusted under 35 U.S.C. 154(b) by 1010 days.

(21) Appl. No.: 10/668,537

(22) Filed: Sep. 23, 2003

(65) Prior Publication Data

US 2005/0063515 A1 Mar. 24, 2005

(51) Int. Cl.
*H01J 35/16* (2006.01)
*B32B 15/04* (2006.01)

(52) U.S. Cl. ....................... 428/209; 428/913; 428/457; 378/203; 378/123; 378/129; 252/478; 252/512; 252/518.1

(58) Field of Classification Search ................. 428/457, 428/469, 689, 702, 913, 402, 209–210; 378/123, 378/129, 143
See application file for complete search history.

(56) References Cited

U.S. PATENT DOCUMENTS 3,400,882 A * 9/1968 Mcmanus .................... 417/48
5,725,808 A * 3/1998 Tormey et al. .............. 252/514
6,329,098 B1 * 12/2001 Bliesner ..................... 429/103
6,456,692 B1 9/2002 Smith

OTHER PUBLICATIONS

Hawley's Condensed Chemical Dictionary 13$^{th}$ Edition, p. 231.*
U.S. Appl. No. 10/317,791, filed Dec. 12, 2002, Miller et al.
U.S. Appl. No. 10/223,133, filed Aug. 19, 2002, Andrews, et al.
U.S. Appl. No. 10/122,567, filed Apr. 15, 2002, Arnold et al.
U.S. Appl. No. 09/855,591, filed May 14, 2001, Andrews.
HPC High Performance Coatings, Inc., Performance Technical Report, (High Performance Coatings, Inc.).
HPC High Performance Coatings, Inc., Engineering Bulletin, Passivating Thermal Barrier Coating, (High Performance Coatings, Inc.).
HPC High Performance Coatings, Inc., Emissivity Study, (High Performance Coatings, Inc.).
HPC order form (Here are my parts for processing) printed from internet Aug. 20, 2003.
About Rebel Rods, pages printed from http://www.rebelrods.com/about.htm printed Aug. 20, 2003.
Contact Rebel Rods, pages printed from http://www.rebelrods.com/contact.htm printed Aug. 20, 2003.
Contact Us, pages printed from http://www.hpcoatings.com/contact_us.htm, printed Aug. 20, 2003.
HPC, High Performance Coatings, pages printed from http://www.hpcoatings.com/ printed on Aug. 20, 2003.

* cited by examiner

*Primary Examiner*—John J. Zimmerman
*Assistant Examiner*—Aaron Austin
(74) *Attorney, Agent, or Firm*—Workman Nydegger

(57) ABSTRACT

A metal x-ray device component is provided that includes a high emissivity inorganically bonded ceramic coating that can be applied with minimal surface preparation and that provides good resistance to corrosion and oxidation of substrates in high temperature, vacuum environments. The coating has good dielectric properties, is stable in the high temperature, vacuum environment characteristic of x-ray devices, and provides effective and reliable performance over a wide range of operating temperatures.

10 Claims, 3 Drawing Sheets

X-RAY DEVICE COMPONENT WITH EMISSIVE INORGANIC COATING

RELATED APPLICATIONS

Not applicable.

BACKGROUND OF THE INVENTION

1. Field of the Invention

The present invention relates generally to x-ray systems, devices, and related components. More particularly, exemplary embodiments of the invention concern x-ray device components that include an emissive inorganic coating that can be applied with minimal surface preparation and that provides good resistance to corrosion and oxidation of substrates in high temperature environments. Depending upon the application, the emissivity of the coating employed in connection with a particular embodiment may vary.

2. Related Technology

Various aspects of the operation of x-ray devices often result in the exposure of many of the x-ray device components to extreme operating conditions that can damage or destroy those components over time. For example, the generation of x-rays, which generally involves accelerating electrons at high speed to a target surface on an anode, may result in operating temperatures as high as 1300° C. both at the anode and elsewhere within the x-ray device. The transmission of heat throughout the x-ray device is facilitated in large part by the conductive nature of the metallic components employed in a typical x-ray device. For example, the metal vacuum enclosure within which the cathode and anode are contained rapidly attains high operating temperatures due to exposure to the heat generated at the anode.

In addition to the aforementioned extreme thermal cycles, x-rays devices typically experience a variety of other unique operating conditions as well. For example, it was noted above that the anode and cathode are disposed in a vacuum enclosure. Generally, the vacuum enclosure is evacuated to a relatively high vacuum in order to ensure the removal of gases and other materials that may cause arcing due to the high potential difference between the cathode and the target surface of the anode.

The specialized operating environment wherein x-ray device components are required to function has stimulated the development of various approaches to the problems that frequently stem from sustained operation in such environments. Problems of particular concern are the degradation, and potential failure, of the metal x-ray device components that are exposed to extreme thermal cycles, vacuums, and other conditions.

Such degradation may be manifested, for example, in the form of corrosion and/or oxidation of metallic structures and surfaces. These effects are not limited to particular types of metal but, instead, generally appear without regard to the particular type of metal with which a component is constructed. For example, both corrosion and oxidation frequently appear in a variety of metallic components, regardless of whether those components are comprised of iron, steel, titanium, aluminum, or other metals.

Because problems such as corrosion and oxidation compromise the performance of the x-ray device and/or impair the integrity of x-ray device components, attempts have been made to prevent, or at least attenuate, these problems by way of various treatments of the metallic components of the x-ray device. Examples of such attempts include various surface treatment techniques, as well as the application of various types of coatings to selected metallic surfaces of the x-ray device components.

At least some of the attempts at coating the metal surfaces, for example, have been directed to improving the emissivity "$\in$" of the coated components so that, notwithstanding the extremely high operating temperature of the x-ray device, the emissive coating would nonetheless return a certain amount of heat back to the interior of the x-ray device, thereby reducing the temperature of the component or components to which the coating was applied. In other situations, it is desirable to provide a component with a coating of relatively low emissivity so that the coated component retains a significant portion of heat, and thereby substantially prevents the destructive transfer of heat to nearby systems and components.

As discussed in further detail below however, typical surface treatments, coatings, and associated processes are problematic and, in any event, often result in a component with emissivity that is either insufficiently low or insufficiently high, and that, accordingly, does little to enhance the overall durability or performance of the x-ray device.

For example, one surface treatment process often employed in connection with x-ray device components involves cleaning the stainless steel surface of a component using a grit blasting procedure. These types of procedures implicate significant problems however. In particular, grit blasting operations typically leave small grit particles embedded in the surface of the blasted part. While some types of embedded grit can be removed from the surface with some effort, it is difficult, if not impossible, to completely remove glass or alumina grit from the treated surface. This situation is of particular concern because the embedded grit may come loose from the surface during operation of the vacuum tube and cause arcing or other problems that can destroy the x-ray tube.

Another typical surface treatment process used in connection with x-ray device components involves firing the surface of the component in a wet hydrogen atmosphere at temperatures of about 900 degrees Celsius ("C"), or higher. However, while hydrogen firing desirably provides a green surface of somewhat improved emissivity, it is typically the case that grit blasting of the surface is required prior to greening in order to obtain more effective results. Such grit blasting of x-ray tube component surfaces can, as noted above, cause serious problems.

As suggested earlier herein, a related problem with both grit blasting and greening processes is that, notwithstanding the use of such treatments, the finished component surface nonetheless has a relatively low emissivity, typically in the range of about 0.2 to about 0.4. Among other things then, such surface preparation methods are ineffective in producing a coating or surface with an emissivity sufficiently high to be beneficial to the coated component. Moreover, even if the aforementioned emissivity level is acceptable, as in a case where the coated component is intended to retain a certain amount of heat, the grit blasting processes typically used in the attainment of that level of emissivity implicates serious problems, as suggested above.

The unique operational conditions that typify x-ray devices cause other problems as well with regard to typical x-ray device component surface treatments. For example, many x-ray device components comprise materials such as stainless steel that include some chromium. When the component, such as a vacuum enclosure, is greened in a wet hydrogen environment, oxidation of the surfaces of the component occurs and chromium oxide forms on those surfaces. However, the high vacuum inside the vacuum enclosure often causes the chromium oxide to separate from the inner surface of the vacuum enclosure during x-ray tube operations.

This is problematic at least because the separation of the chromium oxide causes the off-gassing of oxygen inside the vacuum enclosure. The presence of oxygen within the vacuum enclosure, in conjunction with the extremely high temperatures typically associated with x-ray tube operations, can result in combustion of some parts of the x-ray device and/or other destructive effects. Moreover, the presence of oxygen and chromium oxide within the vacuum enclosure may also contribute to arcing.

Similar problems occur when so-called 'black iron' coatings are used on x-ray device components. Generally, the application of black iron coatings involves plating iron on one or more surfaces of the x-ray tube component and then steaming the coated part at high temperature so that $Fe_3O_4$, or magnetic iron, is formed on the surfaces. Similar to the case of the chromium oxide coatings however, the vacuum inside the vacuum enclosure can cause separation of the magnetic iron from the surface of the coated component. The loose magnetic iron can cause arcing and other problems inside the vacuum enclosure.

A related problem with black iron coatings concerns the effects of the vacuum on the oxygen contained in the magnetic iron. In particular, the relatively high vacuum level often causes oxygen reduction, or dissociation from the magnetic iron. The off-gassing of oxygen in this way may cause serious problems with regard to the operation of the x-ray device, as discussed above. Moreover, the emissivity of the magnetic iron coating can be significantly impaired.

In view of the foregoing, it would be useful to provide x-ray tube components that include an emissive coating that is reliable, stable and effective in the extreme operating conditions typically associated with x-ray devices. In addition, the x-ray tube components should be such that the coating can be readily applied and effectively maintained with no or minimal surface preparation.

BRIEF SUMMARY OF AN EXEMPLARY EMBODIMENT OF THE INVENTION

In general, embodiments of the invention are concerned with x-ray device components that include a durable emissive inorganic coating that can be applied with minimal surface preparation and that provides good resistance to corrosion and oxidation of substrates in high temperature, vacuum environments.

In one exemplary embodiment of the invention, a vacuum enclosure of an x-ray device is provided that defines inner and outer surfaces. The vacuum enclosure substantially comprises a metal such as steel, or a combination of metals, and is suited for sustained use in high temperature, vacuum environments.

At least a portion of the inner surface of the vacuum enclosure is spray coated with an inorganic ceramic slurry. The coating is such that minimal surface preparation is required prior to application of the coating. The cured coating adheres well to the underlying substrate, or surface, to which it is applied and, exemplarily, has a relatively high emissivity that generally serves to reduce the level of heat to which the substrate is exposed. Further, the durability and integrity of the coating over a wide range of operating conditions serve to minimize corrosion or oxidation of the substrate that might otherwise occur as a result of environmental conditions. Additionally, the coating provides a protective barrier for the underlying substrate, so as to seal and contain any particulates that might form on the substrate.

These and other, aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF SELECTED EMBODIMENTS OF THE INVENTION

Figure 1:
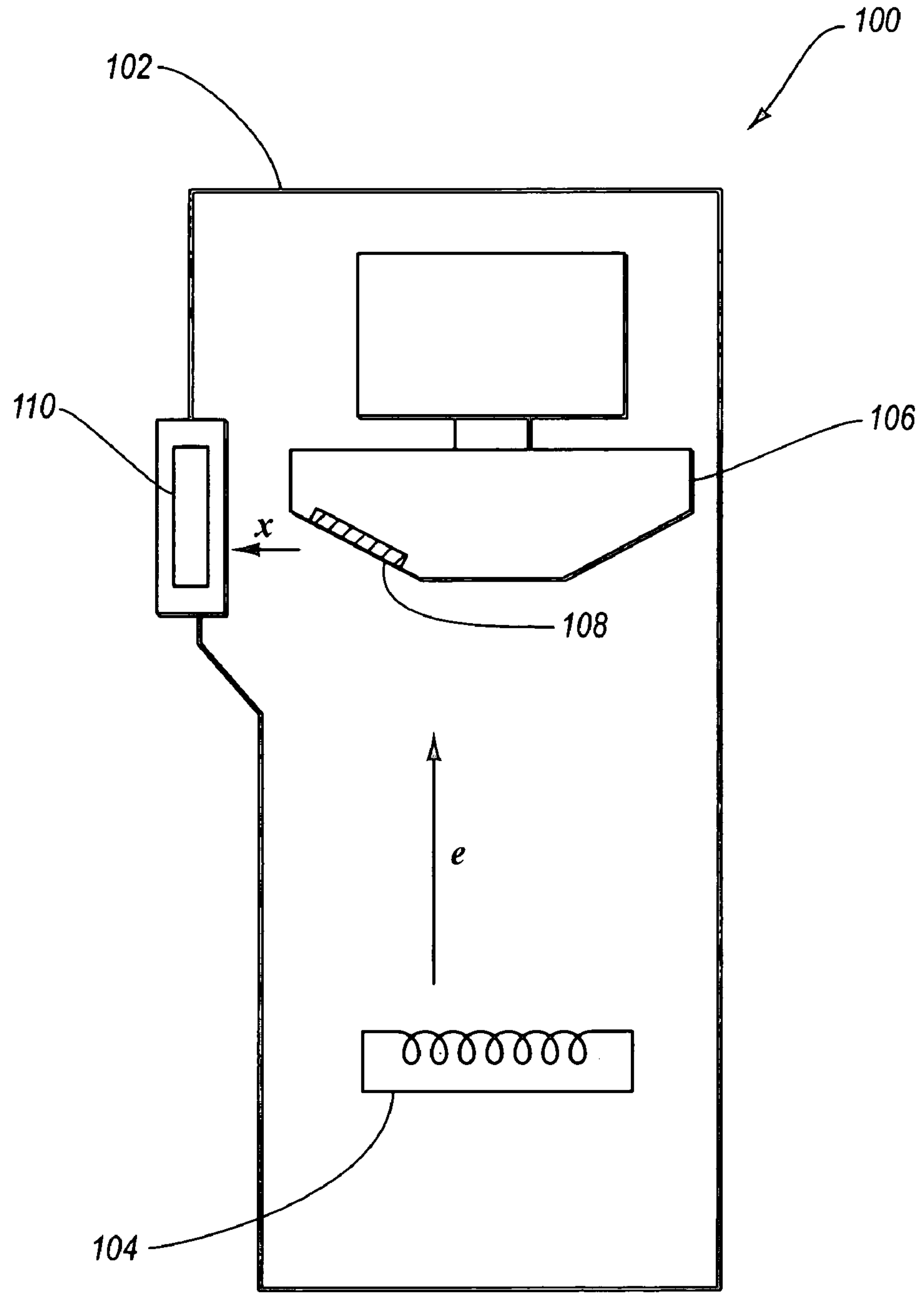
FIG. 1 is a top view of an exemplary implementation of a rotating anode type x-ray device in connection with which one or more coated components may be employed.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

As noted earlier, exemplary embodiments of the invention concern x-ray device components that include an emissive inorganic coating that can be applied to the x-ray device component with minimal surface preparation. Among other things, the coating lends a high degree of emissivity, corrosion and oxidation resistance to the coated x-ray device component. Further, the coating is durable and x-ray device components having coated surfaces can be effectively and reliably employed in a variety of operating conditions, including high temperature, vacuum environments.

A. Exemplary X-Ray Devices

Embodiments of the coated x-ray device components disclosed herein may be usefully employed in connection with various types of x-ray devices, including rotating anode and stationary anode type x-ray devices. Moreover, the emissivity of the coating applied may be selected in accordance with the particular thermal effect that is desired to be achieved. Directing attention now to FIG. 1, details are provided concerning an exemplary rotating anode x-ray device in connection with which one or more of the coated x-ray device components disclosed herein may be employed.

Generally, an x-ray device 100, exemplarily implemented as a rotating anode type x-ray device, is indicated that includes a vacuum enclosure 102 within which are disposed a cathode 104 and anode 106 arranged in a spaced apart configuration. The cathode 104 and anode 106 each include an associated electrical connection (not shown) that collectively facilitate establishment of a high potential difference between the cathode 104 and anode 106. As discussed below, this potential difference enables the generation of x-rays.

The anode 106 includes a target surface 108, exemplarily comprising tungsten or other material(s) of similar characteristics, configured and arranged to receive a stream of electrons "e" generated by the cathode 104. The target surface 108 of the anode is situated proximate a window 110, exemplarily comprising beryllium, of the vacuum enclosure 102, through which x-rays generated at the target surface 108 are directed.

With continuing reference to FIG. 1, the vacuum enclosure 102 comprises an exemplary implementation of a coated x-ray device component as contemplated by the present invention. More generally however, a wide variety of coated x-ray device components may be effectively employed in various capacities throughout the x-ray device and, accordingly, the scope of the invention should not be construed to be limited to vacuum enclosures.

Exemplarily, the vacuum enclosure 102 substantially comprises stainless steel, or other steel. However, various other materials may alternatively be employed in the construction of the vacuum enclosure 102 and/or other x-ray device components. The selection of such alternative materials may be based, at least in part, upon considerations such as, but not limited to, planned operating temperatures, operating pressures, and thermal cycles. More generally, any material that is suited for the high temperature, vacuum environment that characterizes typical x-ray devices and systems, and that can be effectively coated as disclosed herein, may be employed in the construction of the vacuum enclosure 102 and/or other x-ray device components.

Finally, the vacuum enclosure 102 exemplarily includes a high emissivity inorganic coating on the exterior surfaces and a low emissivity coating on the interior surfaces. Among other things, this type of configuration contributes to a relative reduction in temperature of components contained within the vacuum enclosure. Specific details concerning the coating are provided below. In general however, the coating comprises a durable material that is adequate to withstand typical x-ray device operating conditions while providing effective and reliable protection of the vacuum enclosure 102, and/or any other components to which the coating is applied, from oxidation, corrosion, and other thermally related problems. In a high emissivity implementation, for example, the coating aids in the rejection of heat from the coated component, thereby contributing to a relative reduction in the temperature of the coated component. For example, a relatively high emissivity implementation may have an emissive coating with an emissivity of about 0.6 or higher.

As suggested by the foregoing, it may be desirable, in other cases, to coat portions of the vacuum enclosure 102 and/or other components with a relatively low emissivity inorganic coating, so as to reduce or prevent the transfer of heat from the coated component to nearby systems and component. For example, a relatively low emissivity implementation may have an missive coating with an emissivity of about 0.2 or lower. Accordingly, the scope of the invention should not be construed to be limited solely to coated x-ray device components that include a relatively high emissivity inorganic coating.

Prior to operation of the x-ray device 100, the vacuum enclosure 102 is evacuated so as to substantially remove gases and other materials. Among other things, this evacuation procedure helps to avoid arcing and other problems that would likely otherwise occur as a result of the high potential between the cathode 104 and the anode 106. Once a desired vacuum has been achieved, the vacuum enclosure 102 is sealed.

In operation, the potential between the cathode 104 and the anode 106 causes the electrons emitted by the cathode 104 to accelerate rapidly toward the target surface 108 of the anode 106. The electrons impinge upon the target surface 108, thereby generating x-rays that are directed through window 110 of the vacuum enclosure 102.

The highly emissive nature of the coating on the inner surface of the exemplary vacuum enclosure 102 contributes significantly to the ability of the vacuum enclosure 102 to reject heat. Consequently, the operating temperature of the coated vacuum enclosure 102 is materially lower than would otherwise be the case.

Additionally, the durable nature of the coating is effective in preventing, or at least attenuating, any oxidation or corrosion of the vacuum enclosure 102 that would likely occur in the absence of such a coating. Such durability also contributes to the effectiveness of the coating, and the adhesion of the coating to the surfaces of the vacuum enclosure 102, over a wide range of operating conditions. Finally, because the coating is sometimes applied without requiring any grit blasting procedures, the problems associated with the presence of loose grit in the vacuum enclosure 102 are substantially eliminated.

Moreover, even if grit blasting has been performed, the coating is nonetheless effective in reducing or eliminating grit related problems. Specifically, the ability of the coating to completely seal the coated surface results in the effective containment of any materials that may separate from the coated surface.

It was noted earlier herein that coated x-ray device components, such as a vacuum enclosure, are not limited solely for use in connection with rotating anode devices such as the x-ray device 100 discussed above, but may also be usefully employed in connection with stationary anode type x-ray devices as well. Details are provided in FIG. 2, discussed below, concerning an exemplary stationary anode x-ray device in connection with which one or more of the coated x-ray device components disclosed herein may be employed.

Because the operating conditions noted herein as characterizing rotating anode type x-ray devices, such as vacuum, high temperatures, and thermal cycles, are generally similar to those associated with the operation of stationary anode x-ray devices as well, the following discussion will be directed primarily to general aspects of the structure of an exemplary stationary anode x-ray device in connection with which one or more coated x-ray device components may be employed.

Figure 2:
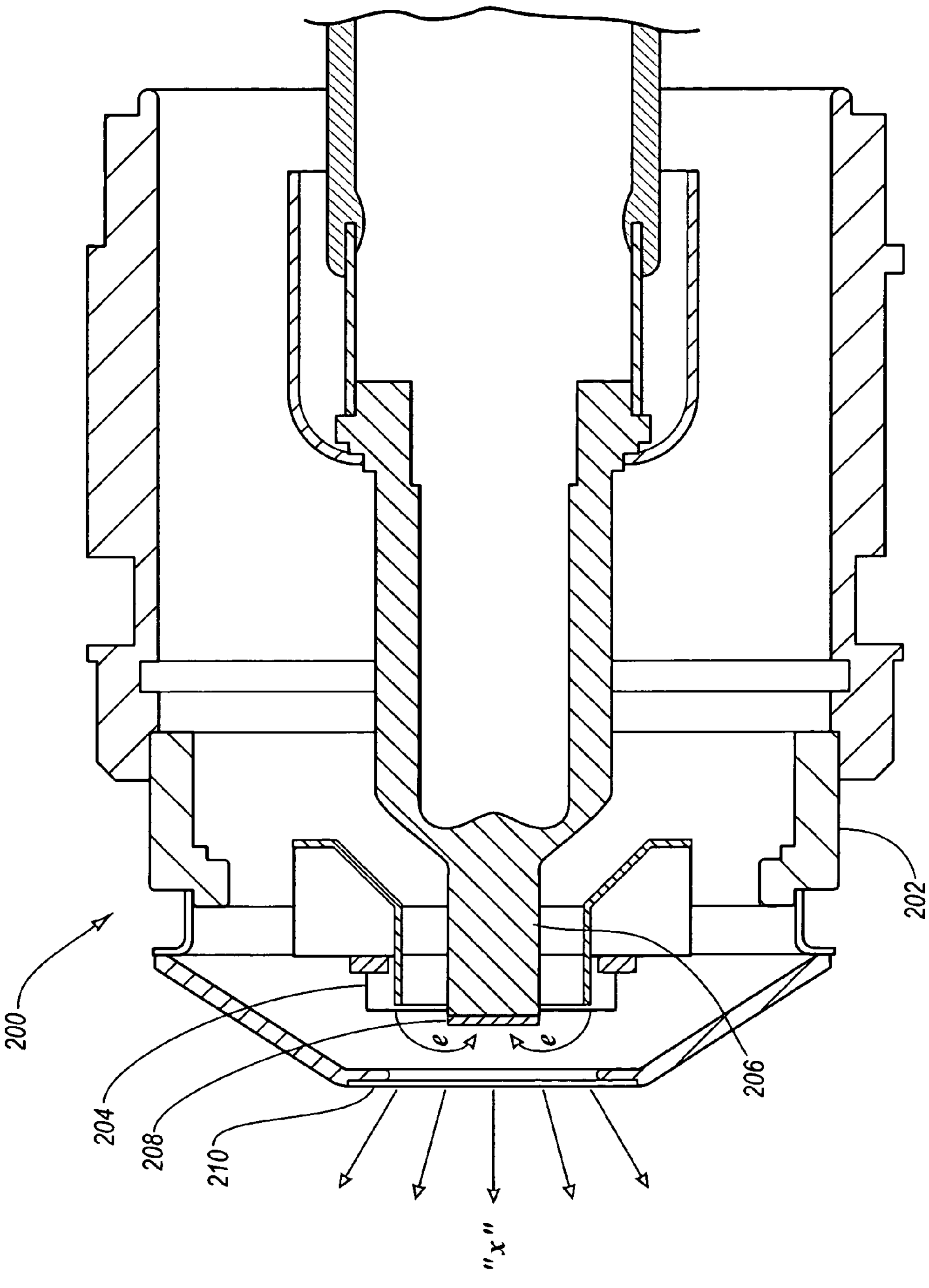
FIG. 2 is a top view of an exemplary implementation of a stationary anode type x-ray device in connection with which one or more coated components may be employed.

With specific attention now to FIG. 2, an x-ray device 200, exemplarily implemented as a stationary anode type x-ray device, is indicated that includes a vacuum enclosure 202 within which is disposed a cathode 204. An anode 206 is also at least partially disposed within the vacuum enclosure 202. The cathode 204 and anode 206 each include an associated electrical connection (not shown) that collectively facilitate establishment of a high potential difference between the cathode 204 and anode 206.

The anode 206 includes a target surface 208, exemplarily comprising tungsten or other material(s) of similar characteristics, configured and arranged to receive electrons "e" generated by the cathode 204. The target surface 208 of the anode is situated proximate a window 210, exemplarily comprising beryllium, of the vacuum enclosure 202 through which x-rays generated at the target surface 208 are directed.

As in the case of the exemplary vacuum enclosure 102 discussed earlier herein, the vacuum enclosure 202 comprises another exemplary implementation of a coated x-ray device component contemplated by the present invention. Generally, the earlier discussion herein concerning exemplary construction materials for the vacuum enclosure 102 is germane as well to materials used in the construction of the exemplary implementations of the vacuum enclosure 202. Accordingly, some implementations of the vacuum enclosure 202 substantially comprise stainless steel, or other steel. However, various other materials may alternatively be employed in the construction of the vacuum enclosure 202.

Prior to operation of the x-ray device 200, the vacuum enclosure 202 is evacuated so as to substantially remove gases and other materials. Once a desired vacuum has been achieved, the vacuum enclosure 202 is sealed. In operation, the potential between the cathode 204 and the anode 206 causes the electrons emitted by the cathode 204 to accelerate rapidly toward the target surface 208 of the anode 206. The electrons impinge upon the target surface 208, thereby generating x-rays that are directed through window 210 of the vacuum enclosure 202.

Similar to the case of rotating anode x-ray tubes, the x-ray generation process in the x-ray device 200 produces significant heat. However, as discussed in detail below, the highly emissive nature of the coating on the inner surface of the vacuum enclosure 202 is effective in facilitating relatively lower heat retention by the vacuum enclosure, and thereby prevents, or at least attenuates, any oxidation or corrosion of the vacuum enclosure 202 that would likely occur in the absence of such a coating. In some applications, it is desirable to coat the inner surface of the vacuum enclosure 202 with a low emissivity coating so that heat is retained in the body of the vacuum enclosure 202 rather than being transferred to the components contained within the vacuum enclosure.

B. Exemplary Coated X-Ray Device Component

Figure 3:
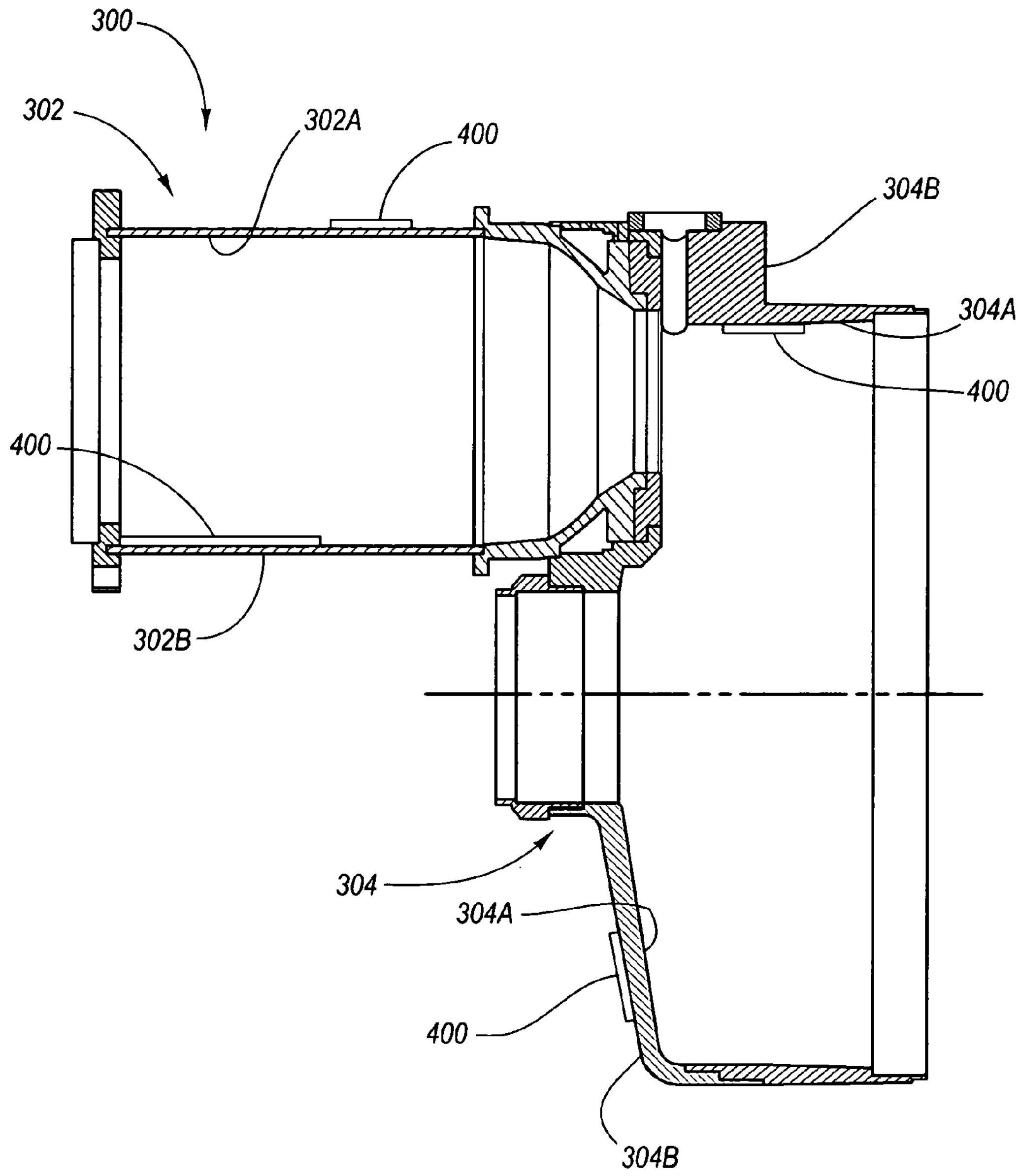
FIG. 3 is a perspective view of an exemplary x-ray device vacuum enclosure that includes an inorganic ceramic coating.

Directing attention now to FIG. 3, a brief discussion is provided concerning an exemplary implementation of a coated x-ray device component. In particular, a vacuum enclosure 300 is provided that includes a can 302 configured to house a cathode (not shown), and a housing 304 attached to the can 302 and configured to house an anode (not shown). The can 302 defines various inner surfaces 302A and outer surfaces 302B, while the housing 304 similarly defines various inner surfaces 304A and outer surfaces 304B.

Exemplarily, at least some of the inner surfaces 302A of the can 302 are coated with a coating 400. In other exemplary implementations, outer surfaces 302B, as well as inner surfaces 304A and outer surfaces 304B are coated as well. More generally however, any surface, or surfaces, of the vacuum enclosure 300, or surfaces of any other component of an x-ray device, may include coating 400. Accordingly, the scope of the invention is not limited to any particular x-ray device component having coating 400.

C. Aspects of an X-Ray Device Component Coating

As suggested by the foregoing, the nature and operation of x-ray devices places significant demands on the constituent components of such x-ray devices. For example, the components within the vacuum enclosure, as well as the vacuum enclosure itself, are subjected to high negative pressures. Further, temperatures as high as 1300° C. are often generated at the anode and nearby components. Not only are the x-ray device components subjected to extreme operating temperatures, but the maximum operating temperature of the x-ray device is typically reached very quickly, resulting in a relatively short thermal cycle that places significant mechanical stress and strain on the components of the x-ray device.

Accordingly, embodiments of x-ray device components, as exemplified by the vacuum enclosures disclosed herein, include a protective coating on at least some surfaces. The coating comprises a highly emissive, inorganically bonded ceramic slurry incorporating oxide filler materials, with no volatile organic compound ("VOC") emissions, and is effective in providing corrosion and oxidation protection for iron, stainless steel, steel, titanium, aluminum and other metallic substrates. The coating has good dielectric properties, is stable in the high temperature, vacuum environment a characteristic of x-ray devices, and provides effective and reliable performance over operating temperatures ranging as high as about 1450° F.

Only minimal surface preparation of the x-ray device component is required prior to spray application of the coating. Generally, the surface to be coated must be substantially free of dirt, oils and oxides and, in at least some implementations, is degreased by processes such as vapor or thermal oxidation. In an exemplary degreasing process, the surface is degreased by vapor or thermal oxidation at about 350° F. for about one hour. Of course, aspects of this exemplary cleaning process may be modified as desired. Surface preparation of the x-ray tube component may be accomplished in other ways as well. Exemplary surface preparation processes include, but are not limited to, etching, oxidizing, phosphating, and grit blasting.

After the surface(s) of the x-ray device component have been prepared, the coating is applied. Generally, the coating is well-suited for application by way of a standard, low pressure atomizing spray gun. Exemplarily, the final thickness of the coating is achieved through multiple applications and falls in an exemplary range of about 0.0003 inches thick to about 0.0007 inches thick. However, the coating thickness, as well as the number and type of applications, may be varied as necessary to suit a particular application.

After application, the coating is thermally cured. Exemplarily, the coating is cured for at least thirty minutes after the coated part has reached a temperature of about 650° F. However, both curing times and temperatures may vary depending upon considerations such as, but not limited to, coating thickness, part size, and part materials. Accordingly, aspects of the curing process may be varied as necessary. Finally, the cured coating comprises a porous free ceramic composite strongly adhered to the coated part; and exemplarily appears as a black semi-gloss coating having a relatively smooth surface.

One high emissivity coating having characteristics and properties suitable for implementing the functionality disclosed herein is the passivating thermal barrier coating known by the trade name "HPC/H02," or simply "H02," and produced by High Performance Coatings, Inc. ("HPC"), having corporate headquarters ("HPC West") located at 14788 S. Heritagecrest Way, Bluffdale, Utah, 84065 (phone (801) 501-8303; facsimile (801) 501-8315). Of course, any other coating having properties and performance characteristics comparable to those disclosed herein may alternatively be employed.

Additionally, "HPC/H05," or simply "H05," sold under the trademark HiPerCoat® and produced by HPC, is one example of a low emissivity coating that is well suited for use in applications where it is desired to minimize heat emission from the coated component. The HIPERCOAT® mark is a registered mark of HIGH PERFORMANCE COATINGS, INC. CORPORATION OKLAHOMA for use in connection with protective coatings for metals and the application of protective coatings for metals.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A vacuum enclosure for use in an x-ray device, the vacuum enclosure comprising:

a first portion substantially comprised of metal, and a first emissive coating disposed on the first portion, the first coating substantially comprising an inorganically bonded ceramic having a first degree of emissivity; and a second portion attached to the first portion and substantially comprised of metal, a second emissive coating disposed on the second portion, the second coating substantially comprising an inorganically bonded ceramic having a second degree of emissivity that is less than the first degree of emissivity.

2. The vacuum enclosure as recited in claim 1, wherein when the first and second emissive coatings are in an uncured state, the emissive coatings are substantially free of volatile organic compound emissions.

3. The vacuum enclosure as recited in claim 1, wherein when the first and second emissive coatings are in an uncured state, the emissive coatings take the form of a slurry suitable for application to the first and second components of the vacuum enclosure by spraying.

4. The vacuum enclosure as recited in claim 1, wherein the first emissive coating has an emissivity of about 0.6 or higher.

5. The vacuum enclosure as recited in claim 1, wherein the second emissive coating has an emissivity of about 0.2 or lower.

6. The vacuum enclosure as recited in claim 1, wherein the first and second emissive coatings substantially prevent oxidation of the first and second coated components of the vacuum enclosure at vacuum enclosure temperatures of up to about 1450 degrees F.

7. The vacuum enclosure as recited in claim 1, wherein the first and second emissive coatings substantially prevent corrosion of the first and second coated components of the vacuum enclosure at vacuum enclosure temperatures of up to about 1450 degrees F.

8. The vacuum enclosure as recited in claim 1, wherein the first and second emissive coatings take the form of porous free ceramic composites.

9. The vacuum enclosure as recited in claim 1, wherein the first portion of the vacuum enclosure comprises part of an exterior surface of the vacuum enclosure.

10. The vacuum enclosure as recited in claim 1, wherein the second portion of the vacuum enclosure comprises part of an interior surface of the vacuum enclosure.

* * * * *

UNITED STATES PATENT AND TRADEMARK OFFICE

CERTIFICATE OF CORRECTION

PATENT NO. : 7,658,987 B2
APPLICATION NO. : 10/668537
DATED : February 9, 2010
INVENTOR(S) : Warburton It is certified that error appears in the above-identified patent and that said Letters Patent is hereby corrected as shown below:

Column 4
Line 18, delete “in which”

Column 4
Line 67, change “establishment” to --an establishment--

Signed and Sealed this
Nineteenth Day of February, 2013

Teresa Stanek Rea
*Acting Director of the United States Patent and Trademark Office*